(12) United States Patent
Xu et al.

(10) Patent No.: US 10,068,144 B2
(45) Date of Patent: Sep. 4, 2018

(54) ASSOCIATION METHOD AND ASSOCIATION APPARATUS

(71) Applicant: Beijing Zhigu Rui Tuo Tech Co., Ltd, Beijing (CN)

(72) Inventors: Ran Xu, Beijing (CN); Wei Shi, Beijing (CN)

(73) Assignee: Beijing Zhigu Rui Tuo Tech Co., Ltd, Beijing (CN)

( * ) Notice: Subject to any disclaimer, the term of this patent is extended or adjusted under 35 U.S.C. 154(b) by 105 days.

(21) Appl. No.: 15/305,656

(22) PCT Filed: Apr. 16, 2015

(86) PCT No.: PCT/CN2015/076713
§ 371 (c)(1),
(2) Date: Oct. 20, 2016

(87) PCT Pub. No.: WO2015/161751
PCT Pub. Date: Oct. 29, 2015

(65) Prior Publication Data
US 2017/0046585 A1 Feb. 16, 2017

(30) Foreign Application Priority Data
Apr. 21, 2014 (CN) .......................... 2014 1 0160226

(51) Int. Cl.
*G06K 9/00* (2006.01)
*G06K 9/20* (2006.01)
(Continued)

(52) U.S. Cl.
CPC ....... *G06K 9/2063* (2013.01); *G06K 7/10128* (2013.01); *G06K 9/34* (2013.01);
(Continued)

(58) Field of Classification Search
CPC ...... G06K 9/2063; G06K 9/34; G06K 9/6256; G06K 7/10128; G06T 7/11; G06T 2207/20021
See application file for complete search history.

(56) References Cited

U.S. PATENT DOCUMENTS 8,350,675 B2  1/2013  Riechel
8,614,753 B2  12/2013  Ko et al.
(Continued)

FOREIGN PATENT DOCUMENTS

CN  102334332 A  1/2012
CN  102356371 A  2/2012
(Continued)

OTHER PUBLICATIONS

International Search Report for PCT Application No. PCT/CN2015/076713, dated Jul. 17, 2015, 3 pages.

*Primary Examiner* — Ping Hsieh
(74) *Attorney, Agent, or Firm* — Amin, Turocy & Watson, LLP

(57) ABSTRACT

An association relating to the field of communications is enabled. A method comprises: acquiring image data in a view area of an imaging device; dividing the view area into sub-view areas; acquiring an attribute information set of an object in any one of the sub-view areas through beam scanning; in response to that the attribute information set comprises attribute information of multiple objects, dividing the one sub-view area or the view area into secondary sub-view areas; acquiring attribute information of at least one object in any one of the secondary sub-view areas through beam scanning; and establishing a correspondence between the attribute information of the object in the one secondary sub-view area and image data corresponding to the one secondary sub-view area. A user can obtain a correspondence between attribute information of an object and image data of the object more conveniently.

20 Claims, 10 Drawing Sheets

(51) Int. Cl.
  *G06K 9/62*    (2006.01)
  *G06K 7/10*    (2006.01)
  *G06K 9/34*    (2006.01)
  *G06T 7/11*    (2017.01)

(52) U.S. Cl.
  CPC .............. *G06K 9/6256* (2013.01); *G06T 7/11* (2017.01); *G06T 2207/20021* (2013.01)

(56) References Cited

U.S. PATENT DOCUMENTS

| | | |
|---|---|---|
| 8,810,401 B2 | 8/2014 | Karttaavi et al. |
| 8,823,861 B2 | 9/2014 | Yoshida |
| 2011/0158517 A1* | 6/2011 | Dai .......................... G06K 9/32 382/165 |
| 2013/0107042 A1 | 5/2013 | Forster |
| 2014/0226900 A1* | 8/2014 | Saban ...................... G02B 5/08 382/165 |
| 2014/0369603 A1* | 12/2014 | Sendik ................. G06K 9/3233 382/195 |

FOREIGN PATENT DOCUMENTS

| | | |
|---|---|---|
| CN | 102859536 A | 1/2013 |
| CN | 103942516 A | 7/2014 |
| WO | 2013067273 A2 | 5/2013 |

\* cited by examiner

| Sub-view area | Object number | First attribute information | Sub-display area |
|---|---|---|---|
| S11 | \ | \ | R11 |
| S12 | 222; 223 | URL1; Shelf life 1 year | R12 |
| S13 | \ | \ | R13 |
| S14 | \ | \ | R14 |
| S15 | \ | \ | R15 |
| S16 | \ | \ | R16 |
| S21 | \ | \ | R21 |
| S22 | \ | \ | R22 |
| S23 | \ | \ | R23 |
| S24 | \ | \ | R24 |
| S25 | 221 | a manufacturer, b address of manufacturer | R25 |
| S26 | \ | \ | R26 |
| S31 | \ | \ | R31 |
| S32 | \ | \ | R32 |
| S33 | \ | \ | R33 |
| S34 | \ | \ | R34 |
| S35 | \ | \ | R35 |
| S36 | \ | \ | R36 |

FIG. 5a

| Sub-view area | Secondary sub-view area | Object number | First attribute information | Secondary sub-display area | Sub-display area |
|---|---|---|---|---|---|
| S12 | S121 | \ | \ | R121 | R12 |
| S12 | S122 | 222 | URL1 | R122 | R12 |
| S12 | S123 | 223 | Shelf life 1 year | R123 | R12 |
| S12 | S124 | \ | \ | R124 | R12 |
| S12 | S125 | \ | \ | R125 | R12 |

FIG. 5b

ASSOCIATION METHOD AND ASSOCIATION APPARATUS

RELATED APPLICATION

The present application is a U.S. National Stage filing under 35 U.S.C. § 371 of international patent cooperation treaty (PCT) application No. PCT/CN2015/076713, filed Apr. 16, 2015, and entitled "ASSOCIATION METHOD AND ASSOCIATION APPARATUS", which claims the benefit of priority to Chinese Patent Application No. 201410160226.8, filed on Apr. 21, 2014, which applications are hereby incorporated into the present application by reference herein in their respective entireties.

TECHNICAL FIELD

The present application relates to the field of communications technologies, and in particular, to an association method and an association apparatus.

BACKGROUND

With the development of electronic apparatuses, photographing apparatuses such as portable cameras, single-lens reflex cameras, and smartphones become popular gradually. People may conveniently use these photographing apparatuses for photographing, and people's lives are greatly enriched.

In the meantime, with the development of the Internet of Things technology, Radio Frequency Identification (RFID) tags are applied more often in commodities. However, information in these RFID tags generally is read by using dedicated RFID readers. Therefore, a camera having a function of reading a RFID tag is proposed. For such a camera, when multiple objects having an RFID tag exist in the view of the camera, the camera cannot establish accurate correspondences between the objects and information in the RFID tags, to cause user experience to be affected.

SUMMARY

An example objective of the present application is to provide an association method and an association apparatus.

According to one example aspect of at least one embodiment of the present application, an association method is provided, where the method comprises:
acquiring image data in a view area of an imaging device;
dividing the view area into multiple sub-view areas;
acquiring an attribute information set of at least one object in any one sub-view area of the multiple sub-view areas through beam scanning;
in response to that the attribute information set comprises attribute information of multiple objects, dividing the one sub-view area or the view area into multiple secondary sub-view areas;
acquiring attribute information of at least one object in any one secondary sub-view area of the multiple secondary sub-view areas through beam scanning; and
establishing a correspondence between the attribute information of the at least one object in the one secondary sub-view area and image data corresponding to the one secondary sub-view area.

According to another example aspect of at least one embodiment of the present application, an association apparatus is provided, where the association apparatus comprises:
an image data acquisition module, configured to acquire image data in a view area of an imaging device;
a first division module, configured to divide the view area into multiple sub-view areas;
an attribute information set acquisition module, configured to acquire an attribute information set of at least one object in any one sub-view area of the multiple sub-view areas through beam scanning;
a second division module, configured to: in response to that the attribute information set comprises attribute information of multiple objects, divide the one sub-view area or the view area into multiple secondary sub-view areas;
an attribute information acquisition module, configured to acquire attribute information of at least one object in any one secondary sub-view area of the multiple secondary sub-view areas through beam scanning; and
a correspondence establishment module, configured to establish a correspondence between the attribute information of the at least one object in the one secondary sub-view area and image data corresponding to the one secondary sub-view area.

BRIEF DESCRIPTION OF THE DRAWINGS

FIG. 5a is an example schematic diagram of a correspondence between an attribute information set of an object in a sub-view area and image data corresponding to the sub-view area in an embodiment of the present application;

FIG. 5b is an example schematic diagram of a correspondence between attribute information of an object in a secondary sub-view area and image data corresponding to the secondary sub-view area in an embodiment of the present application;

DETAILED DESCRIPTION

The example embodiments of the present application are further described in detail with reference to the accompanying drawings and embodiments below. The embodiments below are used for describing the present application rather than to limit the scope of the present application.

Persons skilled in the art understand that in the embodiments of the present application, the serial number of each procedure described above does not mean an execution sequence, and the execution sequence of each procedure should be determined according to the function and internal logic thereof, and should not constitute any limitation on the implementation procedure of the embodiments of the present application.

Figure 1:
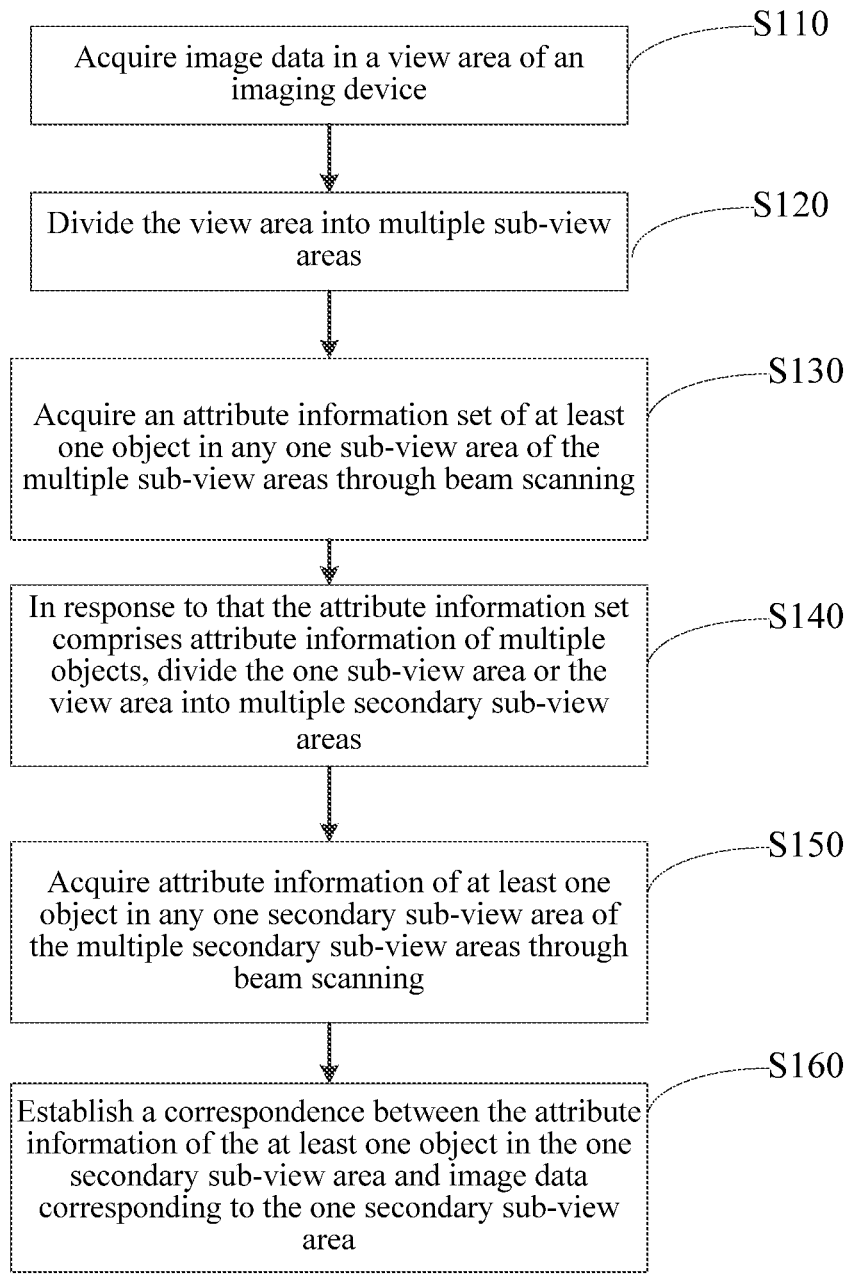
FIG. 1 is an example flowchart of an association method in an embodiment of the present application.

FIG. 1 is a flowchart of an association method in an embodiment of the present application. The association method may be implemented on, for example, an association apparatus. As shown in FIG. 1, the method comprises:

S110: Acquire image data in a view area of an imaging device.

S120: Divide the view area into multiple sub-view areas.

S130: Acquire an attribute information set of at least one object in any one sub-view area of the multiple sub-view areas through beam scanning.

S140: In response to that the attribute information set comprises attribute information of multiple objects, divide the one sub-view area or the view area into multiple secondary sub-view areas.

S150: Acquire attribute information of at least one object in any one secondary sub-view area of the multiple secondary sub-view areas through beam scanning.

S160: Establish a correspondence between the attribute information of the at least one object in the one secondary sub-view area and image data corresponding to the one secondary sub-view area.

In the method in the embodiment of the present application, in an aspect, image data in a view area of an imaging device is acquired, and in an aspect, the view area is divided to obtain multiple sub-view areas; any one sub-view area is scanned by using a beam to acquire an attribute information set of at least one object in the sub-view area; in response to that the attribute information set comprises attribute information of multiple objects, the one sub-view area or the view area is further divided into multiple secondary sub-view areas, and attribute information of at least one object in any one secondary sub-view area is acquired through beam scanning, so as to eventually establish a correspondence between the attribute information of the at least one object in the one secondary sub-view area and image data corresponding to the one secondary sub-view area. Therefore, a user obtains a correspondence between attribute information of at least one object and image data of the at least one object more conveniently.

The functions of Steps S110, S120, S130, S140, S150, and S160 are described in detail below with reference to example embodiments.

S110: Acquire image data in a view area of an imaging device.

Figure 2:
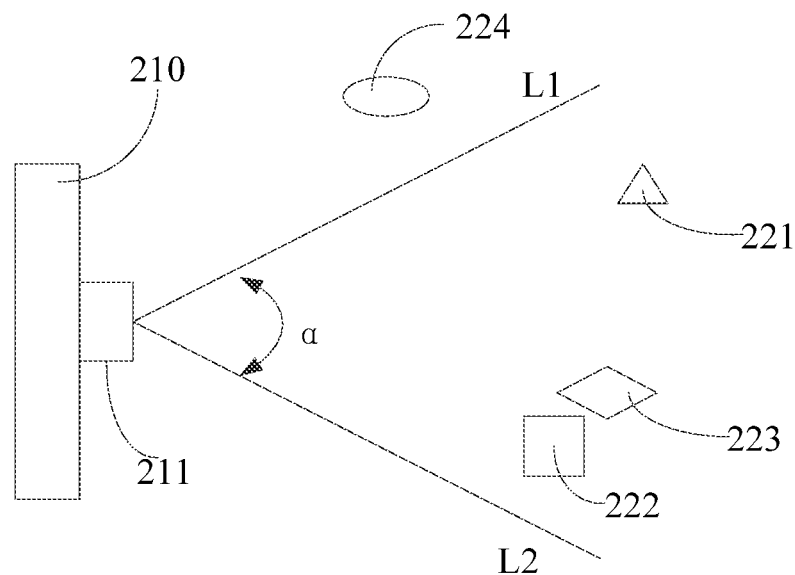
FIG. 2 is an example schematic sectional view of a view area in an embodiment of the present application.

The imaging device may comprise, for example, a camera or a charge-coupled apparatus (CCD). The imaging device may be comprised in the association apparatus, or may be disposed independently from the association apparatus. The view area may generally be determined by a view parameter such as a focal length or view angle of the imaging device. FIG. 2 is a schematic sectional view of the view area, where the imaging device 210 comprises a camera 211. When a view angle of the camera 211 is α, correspondingly L1 may represent an upper boundary of the view area, and L2 may represent a lower boundary of the view area. In addition, FIG. 2 is a schematic sectional view obtained by horizontally sectioning the view area by using a vertical plane comprising a central axis of the camera. A person skilled in the art understands that a spatial structure of the view area is a three-dimensional structure similar to a cone. In FIG. 2, a first object 221, a second object 222, and a third object 223 are located inside the view area, and a fourth object 224 is located outside the view area. In addition, a person skilled in the art understands that the view area may also be determined according to the focal length of the imaging device, which is no longer elaborated here.

The acquired image data may be a photo or a video obtained through photographing with the imaging device, or may also be an image presented on a display screen of the imaging device before a photo or a video is obtained.

S120: Divide the view area into multiple sub-view areas.

Figure 3:
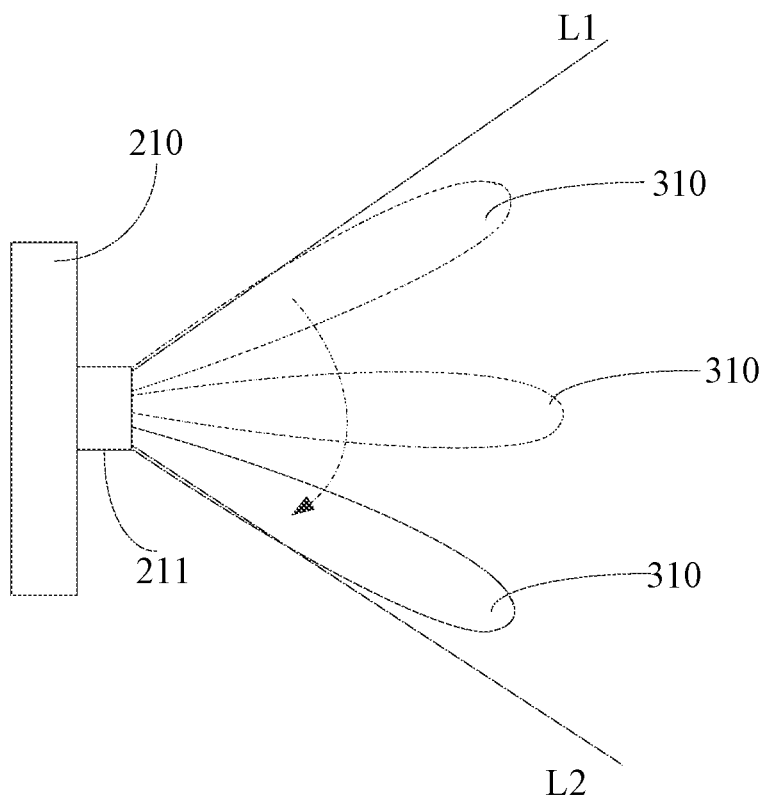
FIG. 3 is an example schematic diagram of sub-view areas after division in an embodiment of the present application.

As shown in FIG. 3, the view area (an area between L1 and L2 in FIG. 3) may be divided into multiple sub-view areas 310. Each sub-view area 310 approximately has a cone form. A person skilled in the art understands that image data corresponding to each sub-view area 310 is a part of image data in the view area. In addition, to enable the sub-view areas 310 to cover the view area desirably, that is, to enable a beam hereinafter to completely scan the entire view area, in an aspect, an overlapped area may exist between different sub-view areas 310, and in another aspect, a granularity as fine as possible should be chosen to divide the view area, the reason being that for a given view area, when the number of the sub-view areas 310 obtained through division is larger, the effect of coverage is better. Therefore, the number of the sub-view areas 310 is at least two, and to avoid a case of a miss during scanning, the number of the sub-view areas 310 should be as large as possible.

S130: Acquire an attribute information set of at least one object in any one sub-view area of the multiple sub-view areas through beam scanning.

In an example embodiment, Step S130 specifically comprises:

S131: Scan the one sub-view area by using a first directed beam.

S132: Receive attribute information fed back by the at least one object in the one sub-view area according to scanning of the first directed beam, so as to obtain the attribute information set of the at least one object in the one sub-view area.

In Step S131, the first directed beam may be formed by using a beamforming technology. Beamforming is a combination of an antenna technology and a digital signal processing technology, and has an objective of transmitting or receiving a directed signal. In an example embodiment, each sub-view area may be scanned in order by using one directed beam. As shown in FIG. 3, each sub-view area 310 may be scanned in order from top to bottom in a direction of the arrow. In another example embodiment, multiple directed beams may be controlled to scan multiple sub-view areas synchronously.

In addition, a coverage area (that is, an area covered by a single time of scanning by a single directed beam) of the directed beam corresponds to the sub-view area. Therefore, to ensure a desirable scanning coverage effect for the entire view area, an area covered by a single time of scanning by the directed beam should be as small as possible, which may be implemented by increasing the number of transmit antennas of the directed beam.

In Step S132, the attribute information fed back by the at least one object in the one sub-view area according to the scanning of the first directed beam may be received through a wireless network. The at least one object in the one sub-view area refers to at least one object that is partially or entirely located in the one sub-view area. In other words, at least a part of any one of the at least one object is located in the one sub-view area.

In an example embodiment, the wireless network comprises at least one of a Wireless Fidelity (Wi-Fi) network, a Bluetooth network, a ZigBee network, a Wireless Broadband (WiBro) network, and a cellular network, and a communications module is disposed on any one object of the at least one object. In response to that the communications module receives the first directed beam, the communications module sends, to the association apparatus, attribute information of the one object stored in the communications module. In such a case, the at least one object in one sub-view area refers to at least one object whose communications module is located in the one sub-view area. In the present application, the attribute information may be related information such as a name, a code, an address of manufacturer, and a date of manufacture of the one object, or may also be address information corresponding to the one object. According to the address information, the association apparatus may raise a query to acquire more detailed information of the one object.

In an example embodiment, the wireless network is an RFID network, and an RFID electronic tag is disposed on any one object of the at least one object. In response to that the RFID electronic tag receives the first directed beam, the RFID electronic tag sends, to the association apparatus, attribute information of the one object stored in the RFID electronic tag. In such a case, the at least one object in one sub-view area refers to at least one object whose RFID electronic tag is located in the one sub-view area.

In response to that the sub-view area comprises one object, the attribute information set comprises attribute information of the one object. That is, the attribute information set comprises one attribute information element. In response to that the sub-view area comprises multiple objects, the attribute information set comprises attribute information of the multiple objects. That is, the attribute information set comprises multiple attribute information elements. In response to that the sub-view area does not comprise an object, the attribute information set does not comprise attribute information of the object. That is, the attribute information set is an empty set.

S140: In response to that the attribute information set comprises attribute information of multiple objects, divide the one sub-view area or the view area into multiple secondary sub-view areas.

As discussed above, the attribute information set may comprise multiple attribute information elements, that is, comprise attribute information of multiple objects. Before the step, the method may further comprise: determining, according to the number of pieces of the attribute information in the attribute information set, whether the attribute information set comprises the attribute information of multiple objects. For example, when the number of pieces of attribute information in the attribute information set is greater than or equal to 2, it is regarded that the attribute information set comprises attribute information of multiple objects. Moreover, in response to that the attribute information set comprises attribute information of one object, a correspondence between the attribute information of the object in the one sub-view area and image data corresponding to the one sub-view area may be directly established.

The one sub-view area is divided into multiple secondary sub-view areas, that is, the one sub-view area is further divided. The secondary sub-view area obtained after division corresponds to a part of space of the one sub-view area, that is, a sectional area of a secondary sub-view area obtained after division in a direction perpendicular to a beam is smaller than a sectional area of the one sub-view area in a direction perpendicular to the beam. Therefore, the number of objects comprised in the secondary sub-view area obtained after division should be smaller than or equal to the number of objects comprised in the one sub-view area.

The view area is divided into multiple secondary sub-view areas, that is, the entire view area is divided again, and a secondary sub-view area obtained after division is smaller than the sub-view area, that is, the sectional area of a secondary sub-view area obtained after division in a direction perpendicular to a beam is smaller than a sectional area of each sub-view area in the direction perpendicular to the beam. Therefore, the number of objects comprised in the secondary sub-view area obtained after division should be smaller than or equal to the number of objects comprised in the one sub-view area.

S150: Acquire attribute information of at least one object in any one secondary sub-view area of the multiple secondary sub-view areas through beam scanning.

This step is similar to Step S130 in principle, and in an example embodiment, Step S150 may comprise:

S151: Scan the one secondary sub-view area by using a second directed beam.

S152: Receive attribute information fed back by the at least one object in the one secondary sub-view area according to scanning of the second directed beam.

Specifically, Step S151 is similar to Step S131 in principle. However, because the sectional area of the secondary sub-view area in the direction perpendicular to the beam is smaller than the sectional area of the one sub-view area in the direction perpendicular to the beam, a coverage area of the second directed beam in Step S151 is smaller than a coverage area of the first directed beam in Step S131, which may be implemented by increasing the number of transmit antennas for the second directed beam.

If only the one sub-view area is divided again in Step S140, it is equivalent to that in the method, fewer transmit antennas are used to scan each sub-view area at the beginning of scanning, and in response to a case where a sub-view area comprises multiple objects, the number of transmit antennas is increased to further scan the sub-view area in a fine manner. Compared with fine scanning of an entire view area from the beginning, the method helps to improve efficiency of scanning an entire view area and reduce energy consumption.

If the entire view area is divided again in Step S140, it is equivalent to that in the method, fewer transmit antennas are used to scan each sub-view area at the beginning of scanning, and in response to a case where a sub-view area comprises multiple objects, the number of transmit antennas is increased to further scan the entire view area in a fine manner. Although the method may result in a long scanning time and high energy consumption, the method is simple to control and easy to implement.

In Step S152, the attribute information fed back by the at least one object in the one secondary sub-view area according to scanning of the second directed beam may be received through a wireless network.

The wireless network may also comprise at least one of a Wi-Fi network, a Bluetooth network, a ZigBee network, a WiBro network, and a cellular network, and a communications module is disposed on any one object of the at least one object. In response to that the communications module receives the second directed beam, the communications module sends, to the association apparatus, the attribute information of the one object stored in the communications module.

Alternatively, the wireless network is an RFID network, and an RFID electronic tag is disposed on any one object of the at least one object. In response to that the RFID electronic tag receives the second directed beam, the RFID electronic tag sends, to the association apparatus, the attribute information of the one object stored in the RFID electronic tag.

S160: Establish a correspondence between the attribute information of the at least one object in the one secondary sub-view area and image data corresponding to the one secondary sub-view area.

An example in which the wireless network is an RFID network is used. The RFID electronic tag may be an active electronic tag, or may also be a passive electronic tag, and has a very small size generally in a millimeter level. Therefore, in a case where the coverage area of the second directed beam is sufficiently small, the tag may be scanned in a sufficiently small secondary sub-view area and the attribute information may be received, whereas the attribute information cannot be received in a case of scanning outside the secondary sub-view area, to cause an association to be accurately established between an attribute information set of at least one object in a secondary sub-view area and the secondary sub-view area. In addition, the secondary sub-view area corresponds to a part of image data, to cause a correspondence between an attribute information set of at least one object in the secondary sub-view area and image data corresponding to the secondary sub-view area to be obtained.

Generally, the volume of an object is far larger than that of the tag. It is assumed that a sectional area of the secondary sub-view area in a direction perpendicular to the beam is slightly greater than a sectional area of the tag. Therefore, image data corresponding to the secondary sub-view area is a part of image data of the object. According to a correspondence between the attribute information and the image data corresponding to the secondary sub-view area, a correspondence between the image data of the at least one object and the attribute information may be directly obtained. Moreover, compared with establishment of a correspondence between image data of at least one object and attribute information of the at least one object by using a GPS positioning technology, in the method of the present application, a problem of low precision of GPS positioning does not exist, and therefore, accuracy is higher. Compared with establishment of a correspondence between image data of an object and attribute information of the object in a manner of computing a focusing position, because the volume of a tag is far smaller than that of an object, an error range in the present application generally does not exceed a range of image data of an object, and therefore, accuracy is higher.

Figure 4:
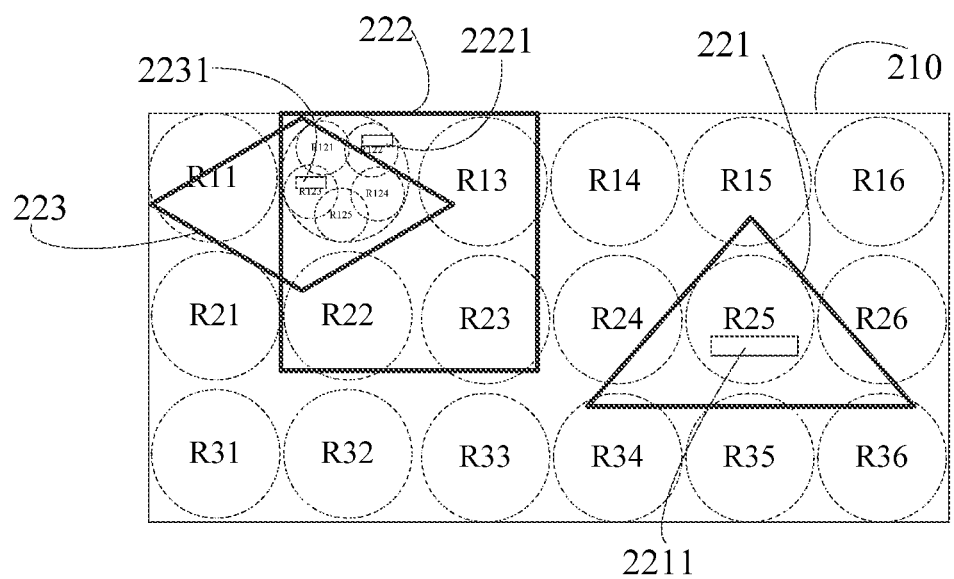
FIG. 4 is an example schematic diagram of a sub-display area and a secondary sub-display area in an embodiment of the present application.

Referring to FIG. 4, corresponding to the sub-view area, the display screen of the imaging device 210 may be divided into multiple sub-display areas. As shown in FIG. 4, the display screen is divided into 18 sub-display areas R11 to R36. It is assumed that the 18 sub-display areas separately correspond to 18 sub-view areas whose numbers are S11 to S36 (not shown). Moreover, it is assumed that an RFID electronic tag (or communications module) 2211 of the first object 221 is located in the sub-view area 25, an RFID electronic tag (or communications module) 2221 of the second object 222 is located in the sub-view area 12, and an RFID electronic tag (or communications module) 2231 of the third object 223 is also located in the sub-view area 12.

It is obtained according to Step S130 of scanning the sub-view area 25 that the attribute information set comprises attribute information of the first object 221, and therefore, it may be obtained that the attribute information of the first object 221 corresponds to image data of the sub-view area 25.

It is obtained according to Step S130 of scanning the sub-view area 12 that the attribute information set comprises attribute information of the second object 222 and attribute information of the third object 223. Therefore, the sub-view area 12 is divided according to Step S140, and it is assumed that in total 5 secondary sub-view areas S121, S122, S123, S124, and S125 are obtained through the division. The 5 secondary sub-view areas correspond to 5 secondary sub-display areas R121, R122, R123, R124, and R125 in FIG. 4, respectively. It may be seen that after the sub-view area 12 is divided, the RFID electronic tag (or communications module) 2221 of the second object 222 is located in the secondary sub-view area 122, and the RFID electronic tag (or communications module) 2231 of the third object 223 is located in the secondary sub-view area 123. Therefore, the attribute information of the second object 222 corresponds to image data of the secondary sub-view area 122, and attribute information of the third object 223 corresponds to image data of the secondary sub-view area 123.

In addition, according to Step S140, in a case where it is found that a sub-view area comprises multiple objects, the entire view area may further be divided again to obtain multiple secondary sub-view areas; the implementation is similar in principle, and is therefore no longer described separately.

In addition, for simplicity, sub-display areas and secondary sub-display areas in FIG. 4 are all shown by a circle; however, a person skilled in the art understands that the sub-display area and the secondary sub-display area at an edge of the display screen should be an ellipse, in which a ratio of the major axis to the minor axis is greater than 1, the sub-display area and the secondary sub-display area at a central position of the display screen is a circle, in which a ratio of the major axis to the minor axis is 1, and from an edge of the display screen to the center of the display screen, a ratio of the major axis to the minor axis of an ellipse corresponding to the sub-display area gradually decreases, that is, gradually approximates 1.

Specifically, the correspondences may be shown in FIG. 5a and FIG. 5b. A record in the 11th row in FIG. 5a represents that the RFID tag 2211 of the first object 221 is located in the sub-view area 25, attribute information of the first object 221 is "a manufacturer, b address of manufacturer", and the sub-view area 25 corresponds to the sub-display area R25, to cause a correspondence between the attribute information "a manufacturer, b address of manufacturer" of the first object 221 and image data in the sub-display area R25 to be obtained.

A record in the 2nd row in FIG. 5a represents that the RFID tag 2221 of the second object 222 and the RFID tag 2231 of the third object 223 are both located in the sub-view area 12, attribute information of the second object 222 is "URL1", attribute information of the third object 223 is "shelf life 1 year", and the sub-view area 12 corresponds to the sub-display area R12, to cause a correspondence between an attribute information set comprising both the attribute information "URL1" of the second object 222 and the attribute information "shelf life 1 year" of the third object 223 and image data in the sub-display area R12 to be obtained. Only according to the correspondence, a user may still be unable to obtain a correspondence between the attribute information "URL1" and an image of the second object 222, and unable to obtain a correspondence between the attribute information "shelf life 1 year" and an image of the third object 223.

Referring to FIG. 5*b*, it may be seen that the RFID tag 2221 of the second object 222 is further located in the secondary sub-view area 122, and accordingly a correspondence between the attribute information "URL1" of the second object 222 and image data in the secondary sub-display area R122 may be obtained. At the same time, it may be seen that the RFID tag 2231 of the third object 223 is further located in the secondary sub-view area 123, and accordingly a correspondence between the attribute information "shelf life 1 year" of the third object 223 and the image data in the secondary sub-display area R123 may be obtained. According to the correspondence, a user may obtain the correspondence between the attribute information "URL1" and the image of the second object 222 and the correspondence between the attribute information "shelf life 1 year" and the image of the third object 223 more easily.

Figure 6:
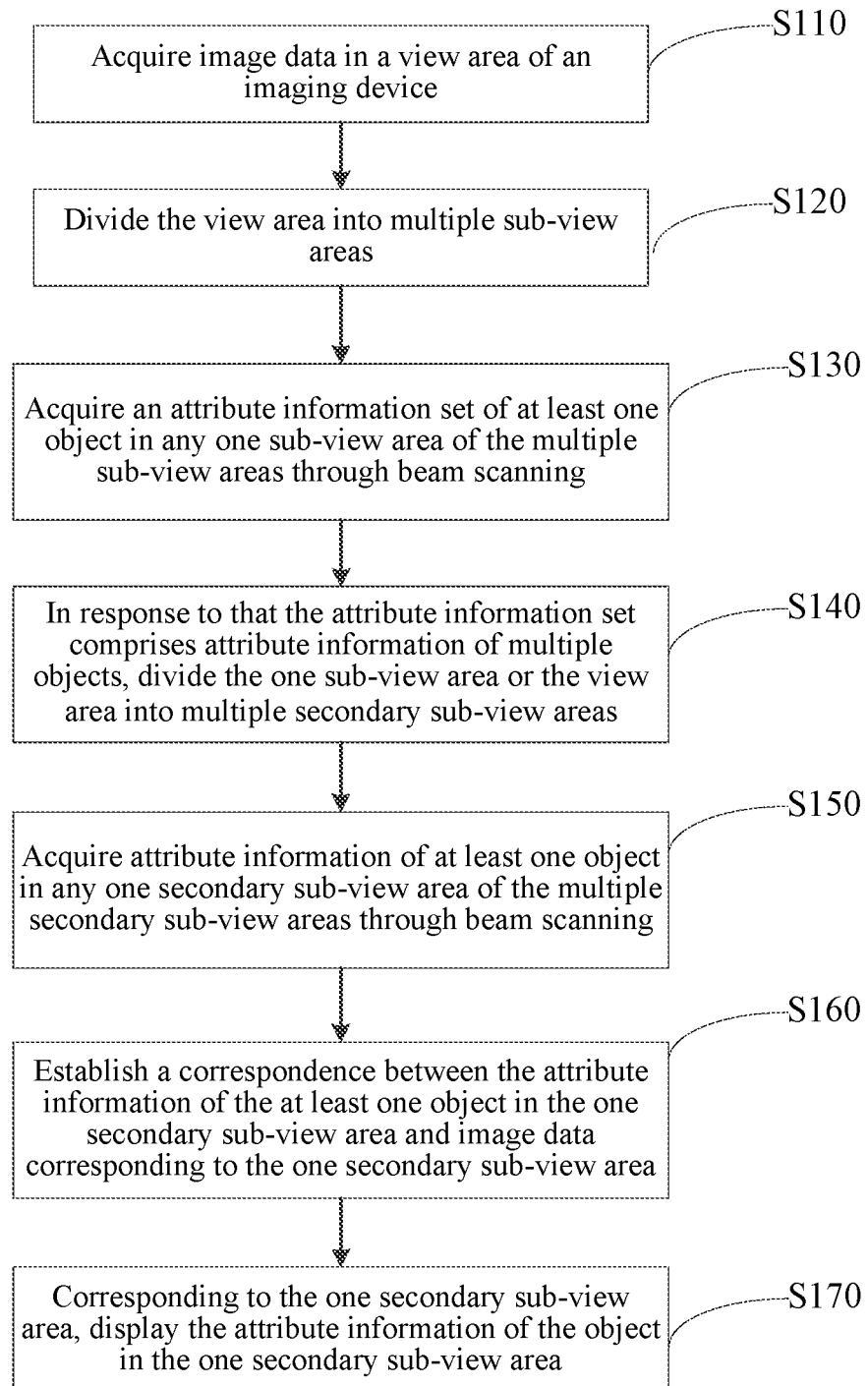
FIG. 6 is an example flowchart of an association method in an example embodiment of the present application.

Referring to FIG. 6, in an example embodiment of the present application, the method may further comprise:

S170: Display, corresponding to the one secondary sub-view area, the attribute information of the at least one object in the one secondary sub-view area.

Figure 7:
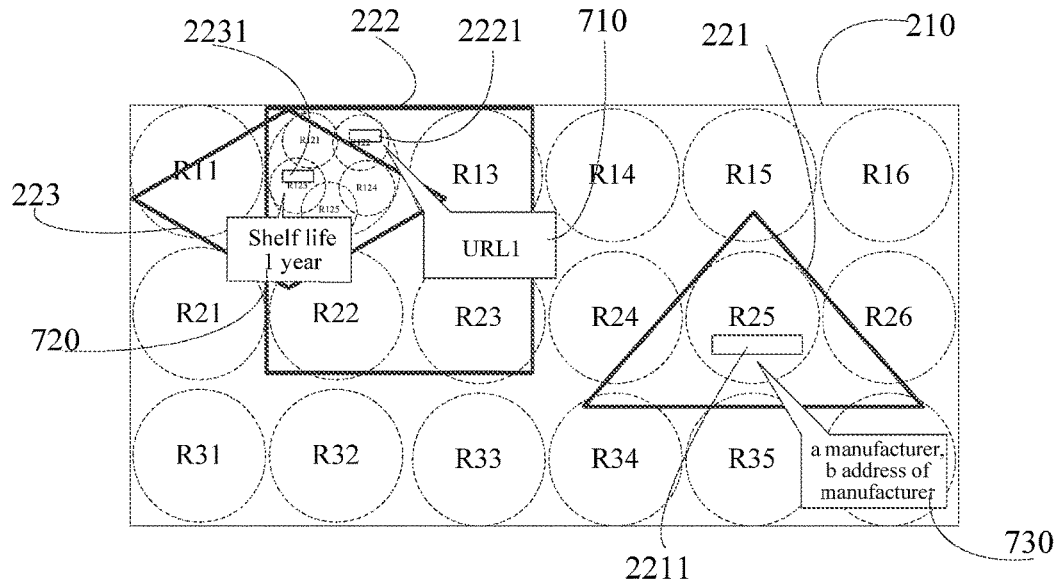
FIG. 7 is an example schematic diagram of attribute information of a displayed object in the present application.

As shown in FIG. 7, when a user inputs an instruction to view the attribute information of the second object 222, the user may long press the image data of the second object 222, and the display apparatus may produce a dialog box 710 in the secondary sub-display area R122 corresponding to the one secondary sub-view area, and display the attribute information "URL1" of the second object 222 in the dialog box 710. Similarly, a dialog box 720 may also be produced corresponding to the secondary sub-display area R123, and the attribute information "shelf life 1 year" of the third object 223 is displayed in the dialog box 720, and a dialog box 730 is produced corresponding to the sub-display area R25, and the attribute information "a manufacturer, b address of manufacturer" of the first object 221 is displayed in the dialog box 730.

Certainly, the association apparatus may also display, corresponding to each secondary sub-view area, in a default state, that is, automatically, attribute information of at least one object in the secondary sub-view area (or, in response to that a sub-display area comprises one object, and corresponding to the sub-view area, attribute information of the object in the sub-view area is displayed). For example, when the imaging device is in a photographing state or a state of view finding before image recording, corresponding to each secondary sub-view area, attribute information of at least one object in the secondary sub-view area is displayed on the display screen.

In addition, an embodiment of the present application further provides a computer-readable medium, comprising computer-readable instructions for performing, when being run, the following operations: performing operations of Steps S110 to S170 in the method in the example embodiments shown in FIG. 1 and FIG. 6 above.

In conclusion, in the association method in the example embodiment of the present application, a correspondence between attribute information of at least one object in each secondary sub-view area and image data corresponding to the secondary sub-view area may be established, and corresponding to each secondary sub-view area, attribute information of at least one object in the secondary sub-view area may be displayed. Therefore, a user may conveniently and visually see an image of an object and at the same time know attribute information of the object.

Figure 8:
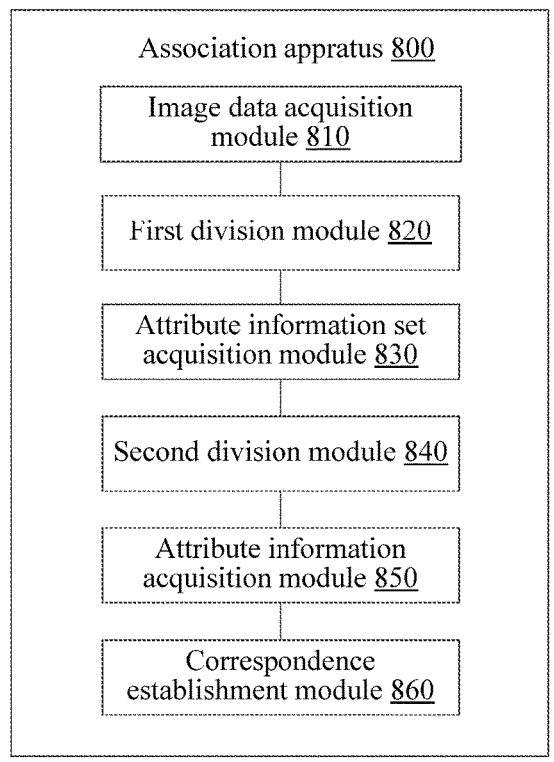
FIG. 8 is an example schematic structural modular diagram of an association apparatus in an embodiment of the present application.

FIG. 8 is a schematic structural modular diagram of an association apparatus in an embodiment of the present application. The association apparatus may comprise an imaging device, or may be disposed independently from an imaging device. The association apparatus may be a smartphone with a camera, which may be a portable camera or a single-lens reflex camera, or may also be a apparatus such as intelligent glasses.

As shown in FIG. 8, the association apparatus 800 comprises:

an image data acquisition module 810, configured to acquire image data in a view area of an imaging device;

a first division module 820, configured to divide the view area into multiple sub-view areas;

an attribute information set acquisition module 830, configured to acquire an attribute information set of at least one object in any one sub-view area of the multiple sub-view areas through beam scanning;

a second division module 840, configured to: in response to that the attribute information set comprises attribute information of multiple objects, divide the one sub-view area or the view area into multiple secondary sub-view areas;

an attribute information acquisition module 850, configured to acquire attribute information of at least one object in any one secondary sub-view area of the multiple secondary sub-view areas through beam scanning; and a correspondence establishment module 860, configured to establish a correspondence between the attribute information of the at least one object in the one secondary sub-view area and image data corresponding to the one secondary sub-view area.

In the association apparatus in the embodiment of the present application, in an aspect, image data in a view area of an imaging device is acquired, and in an aspect, the view area is divided to obtain multiple sub-view areas; the sub-view area is scanned by using a beam to acquire an attribute information set of at least one object in the sub-view area; in response to that the attribute information set comprises attribute information of multiple objects, the one sub-view area or the view area is further divided into multiple secondary sub-view areas, and attribute information of at least one object in any one secondary sub-view area is acquired through beam scanning, so as to eventually establish a correspondence between the attribute information of the at least one object in the one secondary sub-view area and image data corresponding to the one secondary sub-view area. Therefore, it becomes more convenient for a user to obtain a correspondence between attribute information of at least one object and image data of the at least one object.

The functions of the image data acquisition module 810, first division module 820, attribute information set acquisition module 830, second division module 840, attribute information acquisition module 850, and correspondence establishment module 860 are described in detail below with reference to the example embodiments.

The image data acquisition module 810 is configured to acquire image data in a view area of the imaging device.

Figure 9:
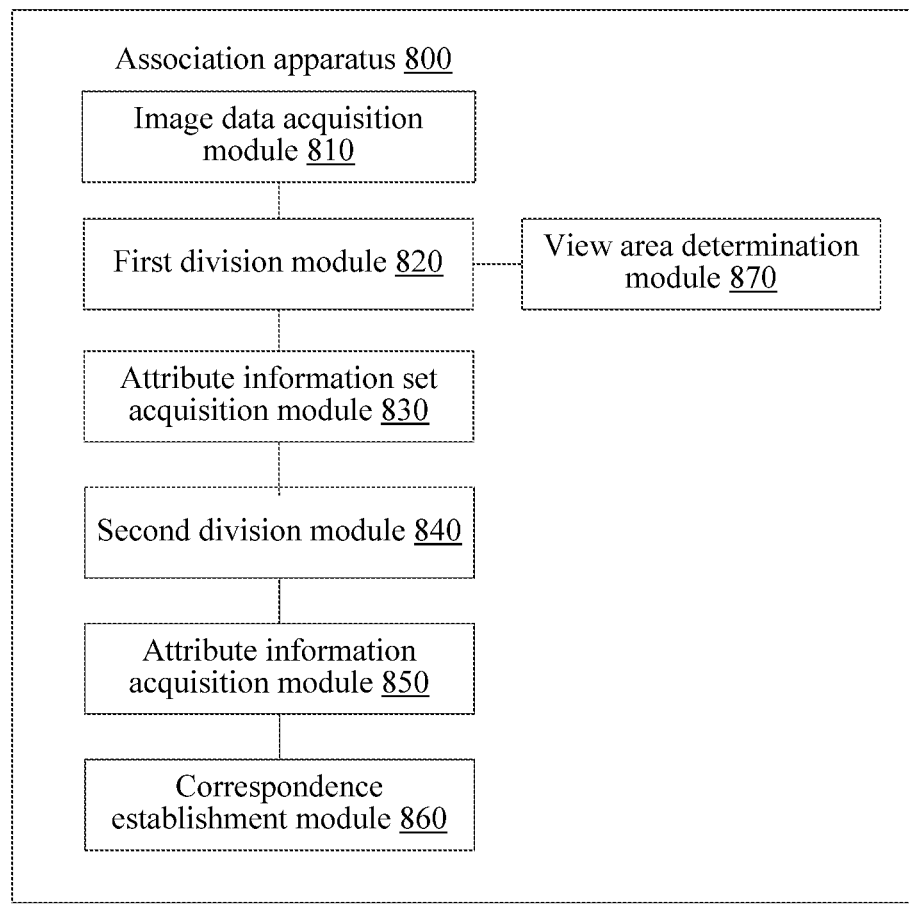
FIG. 9 is an example schematic structural modular diagram of an association apparatus in an example embodiment of an embodiment of the present application.

The imaging device may comprise, for example, a camera, or a CCD. The view area may generally be determined by a view parameter such as a focal length and a view angle of the imaging device. Referring to FIG. 9, in an example embodiment, the association apparatus 800 further comprises:

a view area determination module 870, configured to determine the view area according to a view parameter of the imaging device.

The acquired image data may be a photo or a video obtained through photographing with the imaging device, or may also be an image presented on a display screen of the imaging device before a photo or a video is obtained.

The first division module 820 is configured to divide the view area into multiple sub-view areas.

A sectional view of the sub-view area is shown in FIG. 3, and a person skilled in the art understands that image data corresponding to each sub-view area is a part of image data in the view area. In addition, to enable the sub-view areas to cover the view area desirably, that is, to enable a beam hereinafter to completely scan the entire view area, in an aspect, an overlapped area may exist between different sub-view areas, and in another aspect, the view area should be divided into as many as possible sub-view areas.

The attribute information set acquisition module 830 is configured to acquire an attribute information set of at least one object in any one sub-view area of the multiple sub-view areas through beam scanning.

Figure 10:
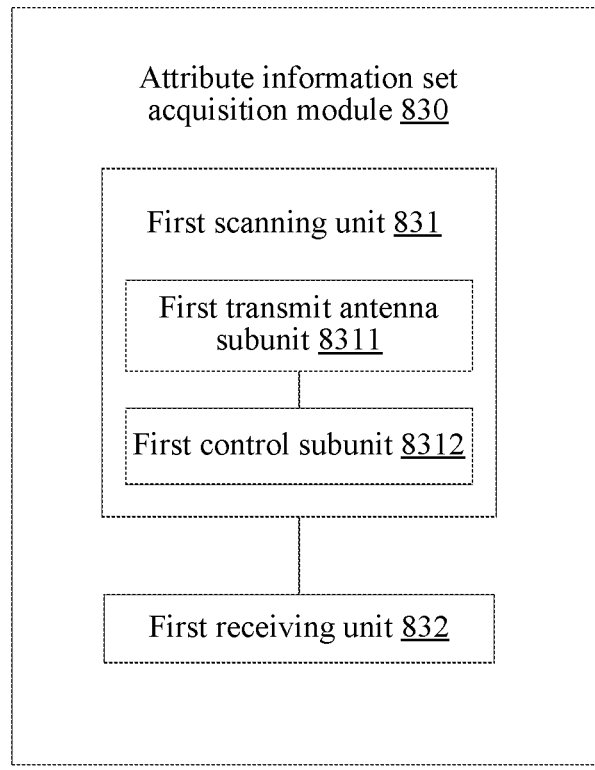
FIG. 10 is an example schematic structural modular diagram of an attribute information set acquisition module in an example embodiment of the present application.

Referring to FIG. 10, in an example embodiment, the attribute information set acquisition module 830 may comprise:

a first scanning unit 831, configured to scan the one sub-view area by using a directed beam; and a first receiving unit 832, configured to receive first attribute information fed back by the at least one object in the one sub-view area according to scanning of the first directed beam.

The first scanning unit 831 may comprise:

a first transmit antenna subunit 8311, configured to form the first directed beam, where the first transmit antenna subunit 8311 may comprise: a beam switching antenna, a phased array antenna, an intelligent antenna, and the like; and a first control subunit 8312, configured to control the first directed beam to scan the one sub-view area.

A coverage area (that is, an area covered by a single time of scanning by a single first directed beam) of the first directed beam corresponds to the sub-view area. Therefore, to ensure a desirable scanning coverage effect for the entire view area, an area covered by a single time of scanning by the first directed beam should be as small as possible, which may be implemented by increasing the number of transmit antennas in the first transmit antenna subunit 8311.

In an example embodiment, the first receiving unit 832 is configured to receive, through a wireless network, the first attribute information fed back by the at least one object in the one sub-view area according to scanning of the first directed beam.

In an example embodiment, the wireless network may comprise at least one of a Wi-Fi network, a Bluetooth network, a ZigBee network, a WiBro network, a cellular network, and a communications module is disposed on any one object of the at least one object. In response to that the communications module receives the directed beam, the communications module sends, to the association apparatus, first attribute information of the one object stored in the communications module.

In an example embodiment, the wireless network is an RFID network, and an RFID electronic tag is disposed on any one object of the at least one object. In response to that the RFID electronic tag receives the directed beam, the RFID electronic tag sends, to the association apparatus, first attribute information of the one object stored in the RFID electronic tag. In this case, an RFID reader may be used for the attribute information acquisition module 830.

The second division module 840 is configured to: in response to that the attribute information set comprises attribute information of multiple objects, divide the one sub-view area or the view area into multiple secondary sub-view areas.

As discussed above, the attribute information set may comprise multiple attribute information elements, that is, comprise attribute information of multiple objects. Before the step, the method may further comprise: determining, according to the number of pieces of the attribute information in the attribute information set, whether the attribute information set comprises the attribute information of multiple objects. For example, when the number of pieces of attribute information in the attribute information set is greater than or equal to 2, it is regarded that the attribute information set comprises attribute information of multiple objects. Moreover, in response to that the attribute information set comprises attribute information of one object, a correspondence between the attribute information of the object in the one sub-view area and image data corresponding to the one sub-view area may be directly established.

The one sub-view area is divided into multiple secondary sub-view areas, that is, the one sub-view area is further divided. The secondary sub-view area obtained after division corresponds to a part of space of the one sub-view area, that is, a sectional area of a secondary sub-view area obtained after division in a direction perpendicular to a beam is smaller than a sectional area of the one sub-view area in a direction perpendicular to the beam. Therefore, the number of objects comprised in the secondary sub-view area obtained after division should be smaller than or equal to the number of objects comprised in the one sub-view area.

The view area is divided into multiple secondary sub-view areas, that is, the entire view area is divided again, and a secondary sub-view area obtained after division is smaller than the sub-view area, that is, the sectional area of a secondary sub-view area obtained after division in a direction perpendicular to a beam is smaller than a sectional area of each sub-view area in the direction perpendicular to the beam. Therefore, the number of objects comprised in the secondary sub-view area obtained after division should be smaller than or equal to the number of objects comprised in the one sub-view area.

The attribute information acquisition module 850 is configured to acquire attribute information of at least one object in any one secondary sub-view area of the multiple secondary sub-view areas through beam scanning.

Figure 11:
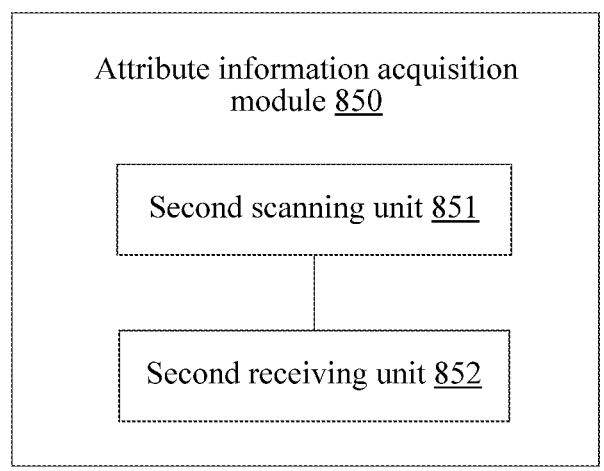
FIG. 11 is an example schematic structural modular diagram of an attribute information acquisition module in an example embodiment of the present application.

Referring to FIG. 11, in an example embodiment, the attribute information acquisition module 850 comprises:

a second scanning unit 851, configured to scan the one secondary sub-view area by using a second directed beam; and a second receiving unit 852, configured to receive attribute information fed back by the at least one object in the one secondary sub-view area according to scanning of the second directed beam.

The second scanning unit 851 is similar to the first scanning unit 831 in principle. However, because the sectional area of the secondary sub-view area in the direction perpendicular to the beam is smaller than the sectional area of the one sub-view area in the direction perpendicular to the beam, a coverage area of the second directed beam is smaller than a coverage area of the first directed beam, which may be implemented by increasing the number of transmit antennas for the second directed beam.

If the second division module 840 only divides the one sub-view area again, it is equivalent to that, fewer transmit antennas are used to scan each sub-view area at the beginning of scanning, and in response to a case where a sub-view area comprises multiple objects, the number of transmit antennas is increased to further scan the sub-view area in a fine manner. Therefore, compared with fine scanning of an entire view area from the beginning, efficiency of scanning an entire view area may be improved and energy consumption may be reduced.

If the second division module 840 divides the entire view area again, it is equivalent to that, fewer transmit antennas are used to scan each sub-view area at the beginning of scanning, and in response to a case where a sub-view area comprises multiple objects, the number of transmit antennas is increased to further scan the entire view area in a fine manner. Although the implementation solution may result in a long scanning time and high energy consumption, the implementation solution is simple to control and easy to implement.

The second receiving unit 852 may also receive, through a wireless network, the attribute information fed back by the at least one object in the one secondary sub-view area according to scanning of the second directed beam.

The wireless network may also comprise at least one of a Wi-Fi network, a Bluetooth network, a ZigBee network, a WiBro network, and a cellular network, and a communications module is disposed on any one object of the at least one object. In response to that the communications module receives the second directed beam, the communications module sends, to the association apparatus, the attribute information of the one object stored in the communications module.

Alternatively, the wireless network is an RFID network, and an RFID electronic tag is disposed on any one object of the at least one object. In response to that the RFID electronic tag receives the second directed beam, the RFID electronic tag sends, to the association apparatus, the attribute information of the one object stored in the RFID electronic tag.

The correspondence establishment module 860 is configured to establish a correspondence between the attribute information of the at least one object in the one secondary sub-view area and image data corresponding to the one secondary sub-view area.

The correspondence between the attribute information of the at least one object in the secondary sub-view area and image data corresponding to the secondary sub-view area may be shown in FIG. 5a and FIG. 5b. The correspondence helps a user to know attribute information of an object in a view area.

Figure 12:
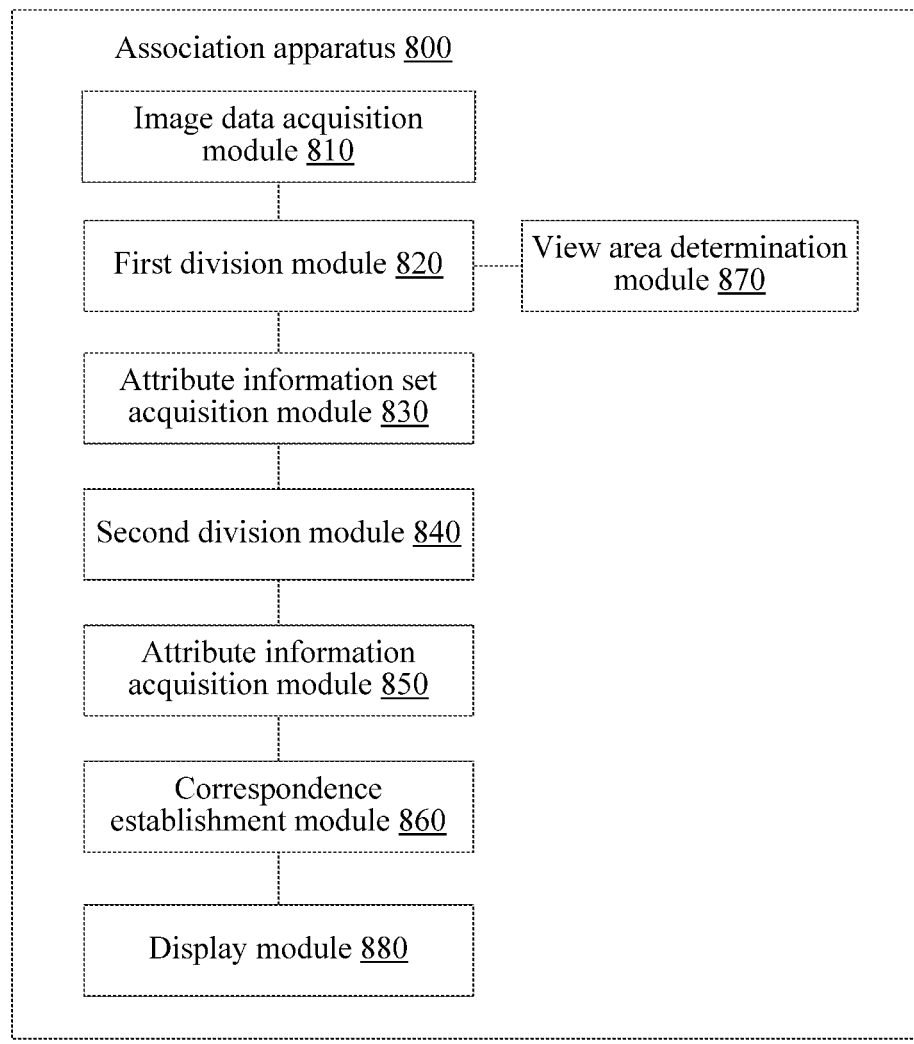
FIG. 12 is an example schematic structural modular diagram of an association apparatus in an example embodiment of the present application.

Referring to FIG. 12, in an example embodiment, the association apparatus 800 further comprises:
a display module 880, configured to display, corresponding to the one secondary sub-view area, the attribute information of the at least one object in the one secondary sub-view area.

In this example embodiment, the attribute information of the at least one object in the secondary sub-view area may be output to a user on the basis of the correspondence according to a need or request. For example, when the user clicks image data corresponding to a target object, the display module 880 outputs, to the user, attribute information of the object in the secondary sub-view area where an electronic tag on the object is located (that is, attribute information of the target object). Accordingly, a user conveniently and visually knows the attribute information of the object in the secondary view area.

Figure 13:
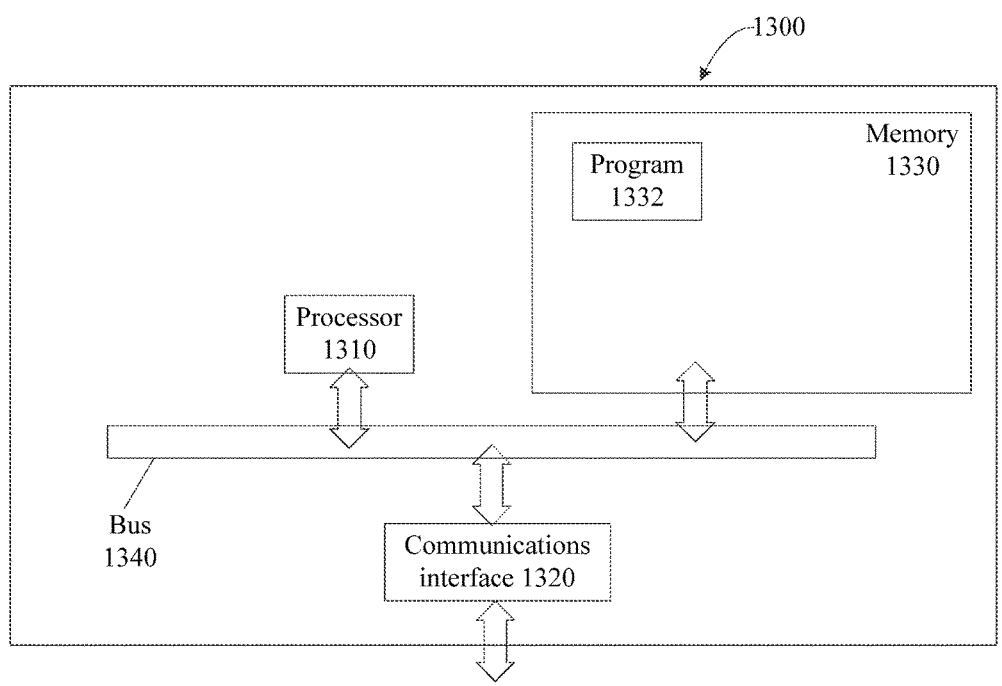
FIG. 13 is an example schematic structural hardware diagram of an association apparatus in an embodiment of the present application.

FIG. 13 shows a hardware structure of the association apparatus in an embodiment of the present application, and the specific embodiments of the present application do not limit the specific implementation of the association apparatus. As shown in FIG. 13, the association apparatus 1300 may comprise:
a processor 1310, a communications interface 1320, a memory 1330, and a communication bus 1340. In this case:
the processor 1310, the communications interface 1320, and the memory 1330 accomplish mutual communications via the communication bus 1340.

The communications interface 1320 is configured to communicate with another network element.

The processor 1310 is configured to execute a program 1332, and specifically, may execute relevant steps in the embodiment of the method shown in FIG. 1 above.

Specifically, the program 1332 may comprise a program code, the program code comprising a computer operation instruction.

The processor 1310 may be a central processing unit CPU, or an application specific integrated circuit ASIC, or be configured to be one or more integrated circuits which implement the embodiments of the present application.

The memory 1330 is configured to store the program 1332. The memory 1330 may comprise a high-speed RAM memory, or may also comprise a non-volatile memory, for example, at least one magnetic disk memory. The program 1332 may specifically be configured to perform the following steps:
acquiring image data in a view area of an imaging device;
dividing the view area into multiple sub-view areas;
acquiring an attribute information set of at least one object in any one sub-view area of the multiple sub-view areas through beam scanning;
in response to that the attribute information set comprises attribute information of multiple objects, dividing the one sub-view area or the view area into multiple secondary sub-view areas;
acquiring attribute information of at least one object in any one secondary sub-view area of the multiple secondary sub-view areas through beam scanning; and
establishing a correspondence between the attribute information of the at least one object in the one secondary sub-view area and image data corresponding to the one secondary sub-view area.

Reference may be made to the corresponding steps or modules in the foregoing embodiments for the specific implementation of the steps in the program 1332, and will not be described here. It may be clearly known by those skilled in the art that reference may be made to the description of corresponding procedures in the foregoing embodiments of the method for the specific working procedures of the apparatuses and modules described above, and will not be described here in order to make the description convenient and concise.

It can be appreciated by those skilled in the art that each exemplary units and method steps described with reference to the embodiments disclosed in this text can be implemented by electronic hardware or a combination of computer software and electronic hardware. Whether these functions are executed in a hardware mode or a software mode depends on the specific applications and design constraint conditions of the technical solutions. The professional technicians can use different methods to implement the functions described with respect to each specific application, but this implementation should not be considered to go beyond the scope of the present application.

If the functions are implemented in the form of a software functional unit and is sold or used as an independent product, it can be stored in a computer-readable storage medium. Based on such understanding, the technical solution of the present application essentially or the part which contributes to the prior art or a part of the technical solution can be embodied in the form of a software product, and the computer software product is stored in a storage medium, and comprises several instructions for enabling a computer apparatus (which can be a personal computer, a controller, or network equipment, etc.) to execute all or some steps of the method described in each embodiment of the present application. The foregoing storage medium comprises various media which can store a program code, such as a USB disk, a mobile hard disk, a read-only memory (ROM), a random access memory (RAM), a magnetic disk or a compact disk.

The above example embodiments are only used to describe the present application, without limiting the present application; various alterations and variants can be made by those skilled in the art without departing from the spirit and scope of the present application, so all equivalent technical solutions also belong to the scope of the present application, and the scope of patent protection of the present application should be defined by claims.

What is claimed is:

1. A method, comprising:
acquiring, by a system comprising a processor, image data in a view area of an imaging device;
dividing, by the system, the view area into sub-view areas;
controlling, by the system, an antenna device to scan a sub-view area of the sub-view areas using a first directed beam;
acquiring, by the system, an attribute information set of at least one object in the sub-view area of the sub-view areas based on the first directed beam;
in response to determining that the attribute information set comprises attribute information of objects, dividing, by the system, the sub-view area or the view area into secondary sub-view areas;
controlling, by the system, the antenna device to scan a secondary sub-view area of the secondary sub-view areas using a second directed beam;
acquiring, by the system, attribute information of at least one object in a secondary sub-view area of the secondary sub-view areas based on the second directed beam; and
establishing, by the system, a correspondence between the attribute information of the at least one object in the secondary sub-view area and other image data corresponding to the secondary sub-view area.

2. The method of claim 1, further comprising:
determining, by the system, the view area according to a view parameter of the imaging device.

3. The method of claim 1, wherein the acquiring the attribute information set of the at least one object in the sub-view area of the sub-view areas comprises:
receiving the attribute information set fed back by the at least one object in the sub-view area in response to the scanning using the first directed beam.

4. The method of claim 3, wherein the attribute information set fed back by the at least one object in the sub-view area is received via a network device of a wireless network.

5. The method of claim 1, wherein the acquiring the attribute information of the at least one object in the secondary sub-view area of the secondary sub-view areas comprises:
receiving the attribute information fed back by the at least one object in the secondary sub-view area in response to the scanning using the second directed beam.

6. The method of claim 5, wherein the attribute information fed back by the at least one object in the secondary sub-view area is received via a network device of a wireless network.

7. The method of claim 4, wherein the wireless network comprises: an RFID network.

8. The method of claim 1, further comprising:
determining, by the system according to a number of pieces of the attribute information in the attribute information set, whether the attribute information set comprises the attribute information of objects.

9. The method of claim 1, further comprising:
displaying, by the system, corresponding to the secondary sub-view area, the attribute information of the at least one object in the secondary sub-view area.

10. An apparatus, comprising:
a memory that stores executable modules; and
a processor, coupled to the memory, that executes or facilitates execution of the executable modules, comprising:
an image data acquisition module configured to acquire first image data in a view area of an imaging device;
a first division module configured to divide the view area into multiple sub-view areas;
an attribute information set acquisition module configured to:
control an antenna device to scan a sub-view area of the sub-view areas using a first directed beam, and
acquire an attribute information set of at least one object in the sub-view area of the multiple sub-view areas based on the first directed beam;
a second division module configured to: in response to determining that the attribute information set comprises attribute information of multiple objects, divide the one sub-view area or the view area into multiple secondary sub-view areas;
an attribute information acquisition module configured to:
control the antenna device to scan a secondary sub-view area of the secondary sub-view areas using a second directed beam, and
acquire attribute information of at least one object in the secondary sub-view area of the multiple secondary sub-view areas based on the second directed beam; and
a correspondence establishment module configured to establish a correspondence between the attribute information of the at least one object in the secondary sub-view area and second image data corresponding to the secondary sub-view area.

11. The apparatus of claim 10, wherein the executable modules further comprise:
a view area determination module configured to determine the view area according to a view parameter of the imaging device.

12. The apparatus of claim 10, wherein the attribute information set acquisition module comprises:

a first receiving unit configured to receive the attribute information fed back by the at least one object in the sub-view area in response to the scanning using the first directed beam.

13. The apparatus of claim 12, wherein the first receiving unit is configured to receive, from a network device of a wireless network, the attribute information fed back by the at least one object in the sub-view area.

14. The apparatus of claim 10, wherein the attribute information acquisition module comprises:
a second receiving unit configured to receive the attribute information fed back by the at least one object in the secondary sub-view area in response to the scanning using the second directed beam.

15. The apparatus of claim 10, wherein at least one of the attribute information set acquisition module or the attribute information acquisition module comprises: a radio frequency identification (RFID) reader.

16. The apparatus of claim 10, wherein the executable modules further comprise:
a determination module configured to determine, according to a number of pieces of the attribute information in the attribute information set, whether the attribute information set comprises the attribute information of the multiple objects.

17. The apparatus of claim 10, wherein the executable modules further comprise:
a display module configured to display, corresponding to the one secondary sub-view area, the attribute information of the at least one object in the one secondary sub-view area.

18. A non-transitory computer readable medium, comprising at least one executable instruction, which, in response to execution, causes an apparatus comprising a processor to perform operations, comprising:
acquiring image data in a view area of an imaging device;
dividing the view area into multiple sub-view areas;
controlling an antenna device to scan a sub-view area of the sub-view areas using a first directed beam;
acquiring an attribute information set of at least one first object in the sub-view area of the multiple sub-view areas based on the first directed beam;
in response to determining that the attribute information set comprises attribute information of multiple objects, dividing the one sub-view area or the view area into multiple secondary sub-view areas;
controlling the antenna device to scan a secondary sub-view area of the secondary sub-view areas using a second directed beam;
acquiring attribute information of at least one second object in the secondary sub-view area of the multiple secondary sub-view areas based on the second directed beam; and
establishing a correspondence between the attribute information of the at least one second object in the one secondary sub-view area and other image data corresponding to the secondary sub-view area.

19. An apparatus, characterized by comprising a processor and a memory, the memory storing executable instructions, the processor being connected to the memory via a communication bus, and when the association apparatus operates, the processor executes the executable instructions stored in the memory, so that the association apparatus executes operations, comprising:
acquiring first image data in a view area of an imaging device;
dividing the view area into multiple sub-view areas;
controlling an antenna device to scan a sub-view area of the sub-view areas using a first directed beam;
acquiring an attribute information set of a first object in a sub-view area of the multiple sub-view areas based on the first directed beam;
in response to determining that the attribute information set comprises attribute information of multiple objects, dividing the sub-view area or the view area into multiple secondary sub-view areas;
controlling the antenna device to scan a secondary sub-view area of the secondary sub-view areas using a second directed beam;
acquiring attribute information of a second object in the secondary sub-view area of the multiple secondary sub-view areas based on the second directed beam; and
establishing a correspondence between the attribute information of the second object in the secondary sub-view area and second image data corresponding to the secondary sub-view area.

20. The apparatus of claim 19, the operations further comprising:
determining the view area according to a view parameter of the imaging device.

* * * * *